United States Patent
Grepaly et al.

(10) Patent No.: US 6,938,932 B2
(45) Date of Patent: Sep. 6, 2005

(54) HIGH-PRESSURE HOSE WITH ADHESIVELY BONDED HOSE COUPLING WHICH CAN BE POST-ASSEMBLED

(75) Inventors: Istvan Grepaly, Budapest (HU); Tibor Nagy, Budapest (HU); Sandor Gelencser, Budapest (HU); Sandor Antal, Budapest (HU); Elemer Lantos, Budapest (HU); Gyula Beteri, Erd (HU); Ferenc Koszo, Budapest (HU); Gyorgy Toth, Budapest (HU)

(73) Assignee: Phoenix Rubber Gumiipari Kft., Budapest (HU)

( * ) Notice: Subject to any disclaimer, the term of this patent is extended or adjusted under 35 U.S.C. 154(b) by 59 days.

(21) Appl. No.: 10/137,455

(22) Filed: May 1, 2002

(65) Prior Publication Data
US 2002/0190522 A1 Dec. 19, 2002

(30) Foreign Application Priority Data
Jun. 13, 2001 (HU) .............................................. 0102437

(51) Int. Cl.⁷ ................................................. F16L 33/00
(52) U.S. Cl. ................................ 285/222.2; 285/222.1; 285/286.1
(58) Field of Search ........................... 285/222.1, 222.2, 285/222.3, 222.4, 222.5, 286.1, 286.2, 290.1, 290.3, 290.5

(56) References Cited

U.S. PATENT DOCUMENTS

| | | | | |
|---|---|---|---|---|
| 1,198,741 A | | 9/1916 | Mausel | |
| 1,994,587 A | * | 3/1935 | Nakane | 285/222.2 |
| 2,122,126 A | * | 6/1938 | Barnard | 285/222.4 |
| 2,219,047 A | * | 10/1940 | Maclachlan | 285/222.2 |
| 2,220,785 A | * | 11/1940 | Goodall | 285/222.2 |
| 2,234,350 A | * | 3/1941 | Muller | 285/222.3 |
| 2,473,441 A | * | 6/1949 | Muller | 285/222.2 |
| 2,506,494 A | * | 5/1950 | Feiler et al. | 285/222.2 |
| 2,940,778 A | * | 6/1960 | Kaiser | 285/222.2 |
| 3,531,143 A | | 9/1970 | Horvath et al. | 285/149 |
| 3,799,587 A | * | 3/1974 | Chevalier et al. | 285/124.1 |
| 4,000,920 A | | 1/1977 | Horvath et al. | 285/149 |
| 4,143,892 A | * | 3/1979 | Murphy et al. | 285/222.2 |
| 4,153,079 A | * | 5/1979 | Ambrose | 138/104 |
| 4,353,581 A | * | 10/1982 | Eisenzimmer | 285/222.4 |
| 4,477,108 A | | 10/1984 | Castelbaum et al. | 285/149 |
| 4,617,213 A | * | 10/1986 | Asano et al. | 138/141 |
| 4,666,191 A | * | 5/1987 | Sotelo et al. | 285/222.2 |
| 4,950,001 A | * | 8/1990 | Briggs | 285/222.1 |
| 5,526,848 A | * | 6/1996 | Terashima et al. | 138/125 |
| 6,019,137 A | | 2/2000 | Secher et al. | 138/109 |
| 6,315,002 B1 | * | 11/2001 | Antal et al. | 138/109 |
| 6,412,825 B1 | * | 7/2002 | Langkjaer | 285/222.2 |

FOREIGN PATENT DOCUMENTS

| GB | 2272740 | * | 5/1994 | 285/222.4 |
|---|---|---|---|---|
| HU | 206 404 A | | 2/1986 | |

* cited by examiner

Primary Examiner—David Bochna
(74) Attorney, Agent, or Firm—Duane Morris LLP

(57) ABSTRACT

The invention relates to a hose comprising a steel coupling (1), in which the structural elements of the hose, namely the reinforcing plies (4), liner (12), carcass (7), and cover (9) are bonded.

Figure 1:
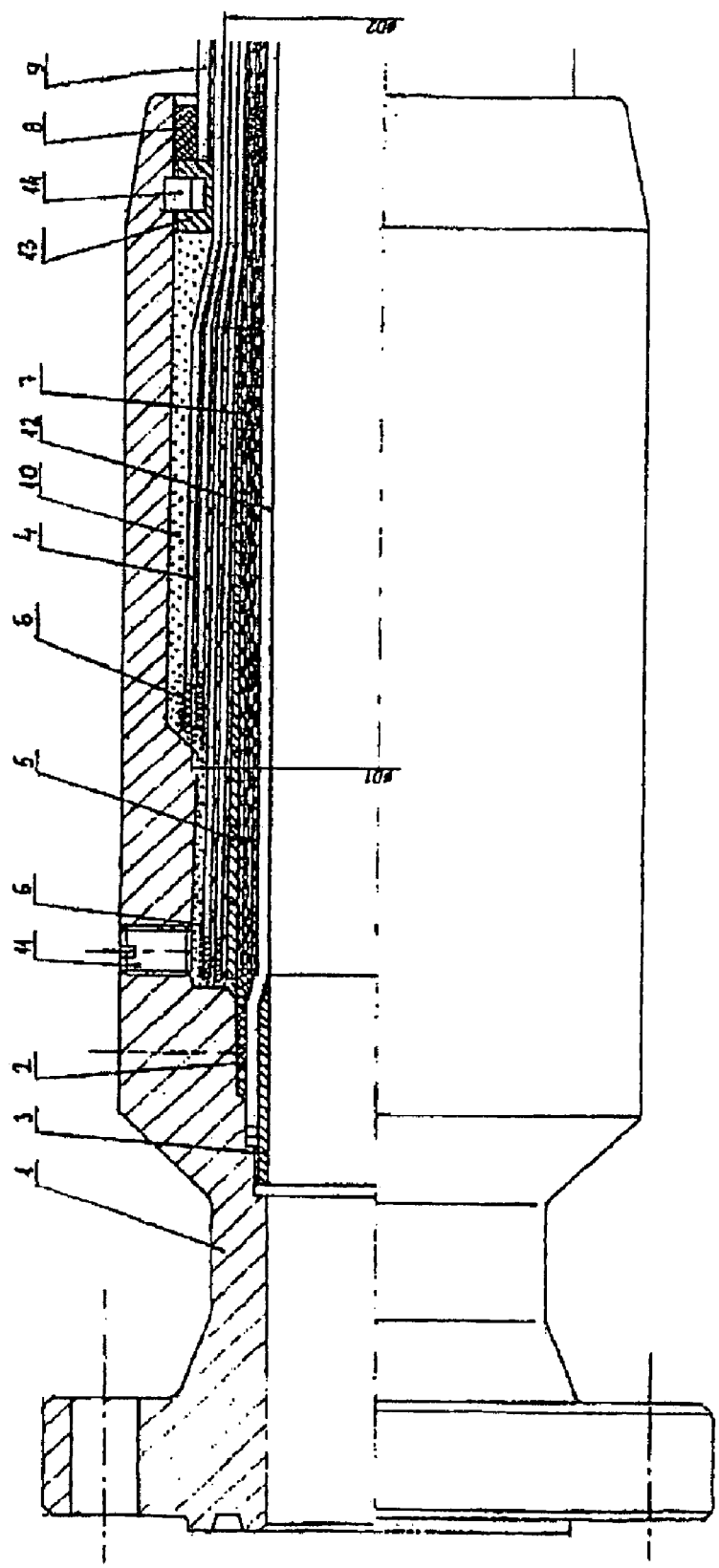

The main feature of the invention is that the reinforcing plies (4) of the hose, which are partially or entirely bonded with rubber, are embedded in the adhesive resin layer in the coupling device (1) assembled to the vulcanized hose.

9 Claims, 2 Drawing Sheets

HIGH-PRESSURE HOSE WITH ADHESIVELY BONDED HOSE COUPLING WHICH CAN BE POST-ASSEMBLED

The invention relates to a high-pressure hose with a steel coupling in which the structural elements of the hose, i.e., the reinforcing plies, liner, carcass, and cover are to be bonded.

It is known that the heavy-duty hoses used mainly in oil mining are generally produced with epoxy bonded couplings which are assembled to the hose body during the manufacturing process. Such hoses may be specified even up to 3,100 bars burst pressure. Hungarian Pat. No. 157 310 and corresponding U.S. Pat. No. 3,531,142 and GB Pat. No. 1 198 741 can be considered as basic patents of the couplings mentioned above. An improved version of the said basic patent is described in Hungarian Pat. No. 168 837 and corresponding U.S. Pat. No. 4,000,920. Another version is protected by U.S. Pat. No. 4,477,108 granted to Goodall Co.

A common drawback of the said patents is that the coupling devices can be assembled only during the manufacture of the hoses.

It is also known that the attaching of couplings to vulcanized hoses has been tried as well. Such an embodiment is described in Hungarian Pat. No. 206 404. However, a drawback of this embodiment is that the rubber vulcanized onto the wire should be cleaned off from the filaments which is a cumbersome work being dangerous to health. In this manner, together with the additional necessary complicated operations, the attaching of a coupling to a 4" hose takes 72 man-hours. The post-assembled coupling described in U.S. Pat. No. 6,019,137 is attached to a plastic hose. Here the cleaning operation is omitted, however, due to the lifting and replacing of the individual reinforcing tendons, the assembling operation is also cumbersome and hard to carry out, similarly to that discussed in connection with the previous reference, and the finished coupling is large and expensive. Naturally, no metal-rubber-adhesive resin combination is used in the said hoses and it could not be formed at all.

It follows that the invention relates to the production of a high-pressure hose provided with a post-assembled hose coupling in order to eliminate the drawbacks of the prior art.

It has been found that surprisingly, on the contrary to the technical preconception, not only steel plies (wires, cables), which are absolutely clean to metal, can be bonded properly in the coupling device but also rubberized ones. One can choose materials from the available adhesives which bond securely the filaments of the rubber-bonded steel wire in the coupling if an appropriate structure is designed. The bond can be strengthened if the hose is also joined by shape, thus, not only the difficult and lengthy cleaning operation can be omitted but even the dimensions of the couplings can be reduced significantly.

Thus, the main feature of the embodiment according to the invention is that the reinforcing plies of the hose, which are partially or entirely bonded to rubber, are embedded into the adhesive resin layer in the coupling device assembled to the vulcanized hose comprising the known elements described above.

In a preferable embodiment, the loosened bunches comprising 2 to 5 filaments of the rubber-bonded reinforcing steel plies are laid on a conical surface whose largest diameter is at least 3 mm larger than that of the uppermost reinforcing ply in the hose body and the formed conical body is joined also by shape to the coupling.

One or two supporting rings can be inserted preferably into the coupling. One of the said supporting rings is a spring which becomes fixed after springing into the groove of the coupling.

The said loosened bunches of the rubber-bonded reinforcing plies, which comprise 2 to 5 filaments and are embedded into rubber, are held in position, for example, by a binding filament wound with a winding pitch of 2°.

In the case of the hose according to the invention, the coupling and the cover of the hose can be joined, for example, by a sealing element joined by a rubber-to-rubber and a metal-to-rubber bond.

Preferably, there is an expanded sleeve inside the coupling.

The step length of the wires in the coupling, which are wound at a greater winding angle, is preferably longer than that of those wound at a smaller winding angle; the step length is intended to be nearly proportional to the sine of the winding angle.

Figure 2:
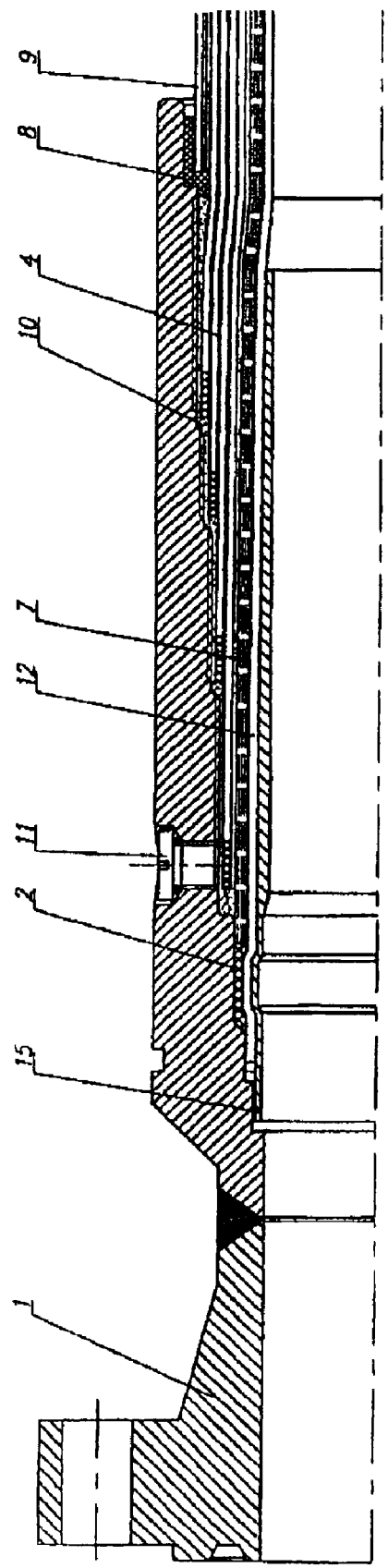

The embodiments according to the invention are illustrated in detail with reference to figures where FIG. 1 shows the hose partly in cross section and partly in elevation, and FIG. 2 shows another embodiment of the hose according to the invention also partly in cross section and partly in elevation.

With reference to FIG. 1, in order to join the coupling by shape, a conical shape is formed from the insert made from spiral-wound steel strip 5 and wire reinforcing plies 4 ravelled into bunches of 2 to 5 filaments so that the largest diameter D1 of the conical shape is at least 3 mm larger than the normal outer diameter D2 of the wires, depending on the hose size and the load.

The said conical surface made from a spiral-wound steel strip can be, for example, a spiral spring forming a spiral insert.

The bunches, which are replaced after ravelling, are held in position by binding filaments 6 wound at an angle of at most 2°. The spiral cone comprising the plies made from spiral-wound steel strip 5 can be slightly expanded during the assembly, thus, it can be fixed easily in the right position and, after assembling, it is compressed and fits tightly on the substructure. In the cone formed in coupling 1, the bunches of wire plies 4 and epoxy resin 10 flowing between them form together an independent load-bearing plastic structural element which provides a high load-bearing capacity even without an epoxy-to-metal bond when it is supported in the conical outer sleeve. The security of the attachment is further increased by elements 13 and 14 built into coupling 1. The split ring-shaped spring 14 springs into the groove of coupling 1 during the assembly. The plastic-combined structure described above is supported by the surface of the ring and prevents the reinforcing plies from slipping out even if the heaviest loads are applied. On cover 9 of the hose, a rubber-to-rubber bond and, in coupling 1, a metal-to-rubber bond are formed by rubber plug 8. Thus, the coupling is protected from the attack of the ambient humidity. Additional structural elements are liner 12 which may be made from either plastic or rubber, load-distributing carcass 7, sealing rubber 2, inner sleeve 3 which prevents potential disjunction in the seal zone. The hose is provided with cover 9. Since the hose is also joined by shape, the coupling disclosed here is shorter than the devices described as the prior art and it can be assembled in 1/10 time compared to the post-assembled couplings known so far. If a hose with a given length is assembled as described above its flexible portion is longer than those achieved in the known assemblies.

With a reference to FIG. 2, the ravelling of wire plies 4 into bunches is omitted. Wire plies 4 are cut back in a stepped fashion. Sleeve 15 is inserted into the hose. The length of the sleeve is intended to be chosen so that it will extend from the seal zone below the uppermost wire plies. The length of the individual steps is intended to be chosen so that the step of the wires wound at a greater angle is longer. (The angle is measured from the circular section perpendicular to the hose axis.) The sine of the winding angle of the wire is most preferably nearly proportional to the step length. Thus, the bonding strength of the wire filaments in the individual plies is nearly the same. The sleeve inserted into the hose increases the diameter of at least the lower wire plies by at least 3 mm, depending on the size and loading conditions. After mounting sleeve 15, coupling 1 is assembled. It is bonded to wire plies 4 by epoxy resin 10. Sleeve 15 is expanded under the sealing rubber in order to achieve a better and safer seal. If the expanding is carried out along the entire inner envelope the strength of the attachment of the coupling can be increased significantly. Seal 8 with a metal-to-rubber bond and a rubber-to-rubber bond protects the device from the attack of the ambient humidity. The structure formed from elements 8, 13, and 14 shown in FIG. 1 can be formed here as well, which leads to further advantages described in connection with the embodiment according to FIG. 1.

Additional structural elements are liner 12, screw 11 which closes the opening where the resin is poured in, cover 9, and lower carcass 7.

Naturally, the invention is not limited to the embodiments illustrated by the figures and to the following examples, in fact, several other constructions can be designed which can be characterised by the common feature that the bonding is formed partially or entirely with a vulcanized rubber layer instead of embedding the reinforcing elements, after cleaning to metal, into the adhesive resin.

EXAMPLES

Example 1

Two 4" hoses were manufactured with the coupling shown in FIG. 1. The coupling was assembled in 7 hours. This period can be further decreased by experience and mechanization. One hose was subjected to 1,000 pressure tests at a pressure of 517 bars and at a temperature of 82° C., without any failure. The other hose was intentionally burst; it burst after subjecting it four times to 1,200 bars. The coupling remained undamaged.

Example 2

A 3" hose with a plastic liner was also manufactured with a coupling according to FIG. 1. During the test, it was folded 15,000 times to a radius of 1,200 mm, near the coupling, at a temperature of 82° C. Then it was subjected 1,000 times to 517 bars, at a temperature of 82° C. The coupling remained undamaged after the tests.

Example 3

A 4" hose with a coupling device according to FIG. 2 was manufactured. The coupling was assembled in 11 hours by the noncontinuous work of two men. It should be also noted that the assembly was not carried out with a routine technology so the time requirement will decrease in the future. The hose burst at 1,360 bars while the coupling remained undamaged.

What is claimed is:

1. A high-pressure hose comprising a steel coupling (1), the hose having structural elements including reinforcing plies (4), a liner (12), a carcass (7), and a cover (9) that are to be bonded, wherein the hose is vulcanized and the reinforcing plies (4) of the hose, which are partially or entirely bonded with rubber, are embedded in an adhesive resin layer in a coupling device (1) assembled to the vulcanized hose, and loosened bunches comprising 2 to 5 filaments of the rubber-bonded reinforcing plies (4) are laid on a conical surface whose largest diameter is at least 3 mm larger than that of the uppermost reinforcing ply in the hose body and a formed conical body is also joined to the coupling (1).

2. The hose according to claim 1, wherein supporting ring(s) (13,14) are inserted into the coupling (1), and one of them is a ring spring which becomes fixed after springing into a groove of the coupling.

3. The hose according to claim 1, wherein the rubber-bonded bunches, which are embedded into rubber, are held in position by a binding filament wound with a winding pitch of at most 2°.

4. The hose according to claim 1, wherein the conical surface made from a spiral-wound steel strip is a spiral spring (5) forming a spiral insert.

5. The hose according to claim 1, wherein the coupling (1) and the cover (9) are joined by a sealing element joining with rubber-to-rubber and metal-to-rubber bonds.

6. The hose according to claim 1, wherein an expanded sleeve (15) is inserted into the coupling (1) which increases the diameter of at least the lower reinforcing ply by at least 3 mm.

7. The hose according to claim 6, wherein the expanded sleeve (15) extends at least to an upper wire step from an area underneath a sealing rubber (2) in the coupling (1).

8. The hose according to claim 1, wherein wires in the coupling (1) have step lengths, the step length of the wire being longer if the wire is wound at a greater winding angle and the step length of the wire being shorter if the wire is wound at smaller winding angle.

9. The hose according to claim 8, wherein the step length is nearly proportional to a sine value belonging to the winding angle.

* * * * *